June 20, 1933. A. E. MAEHLER 1,914,574
INDUSTRIAL OVEN
Filed July 1, 1931 2 Sheets-Sheet 1

INVENTOR:
ARTHUR E. MAEHLER,
BY
Robert Burns
ATTORNEY.

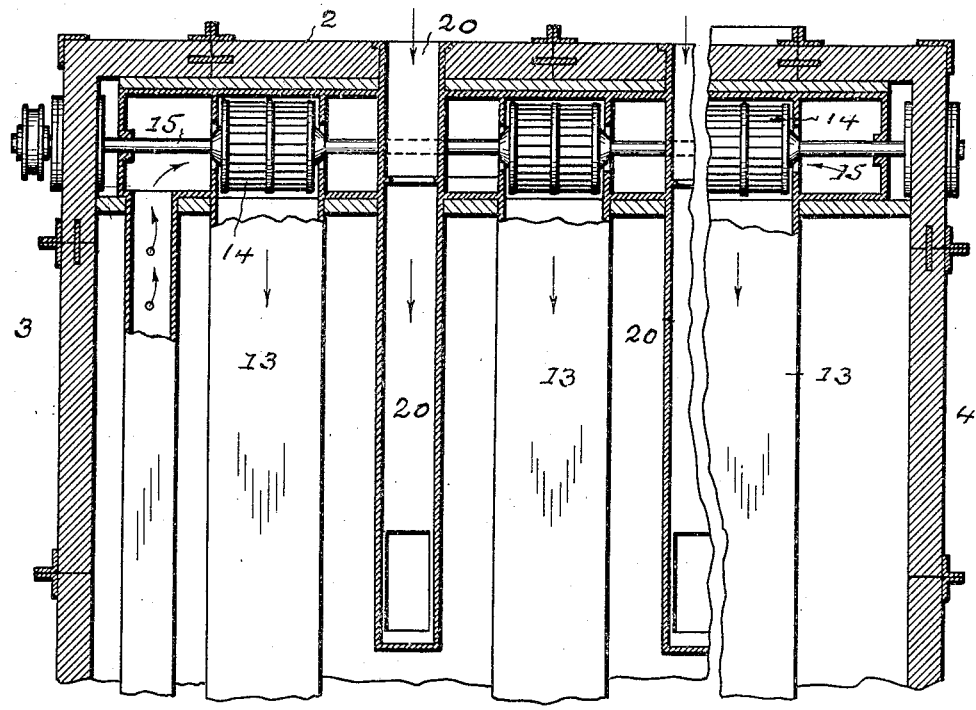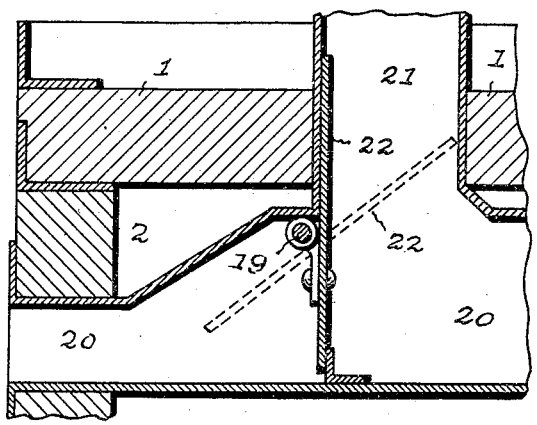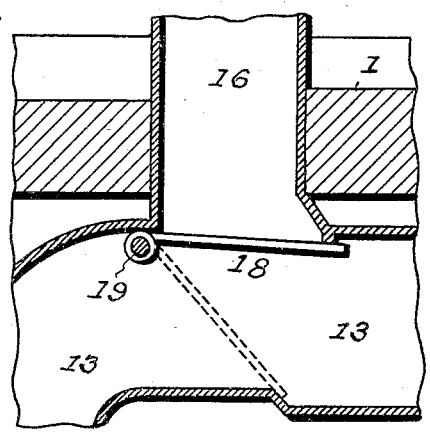

Patented June 20, 1933

1,914,574

UNITED STATES PATENT OFFICE

ARTHUR E. MAEHLER, OF CHICAGO, ILLINOIS

INDUSTRIAL OVEN

Application filed July 1, 1931. Serial No. 548,111.

This invention relates to the directly heated type of industrial drying and enamelling ovens in which successive portions of the aeriform contents of the oven chamber combined with additional supplies of fresh air are forcibly brought into direct contact with the burner or heating element of the oven so as to receive added heat therefrom by a return to the oven chamber. And this improvement has for its object:—

To provide a structural formation and combination of parts and elements, in which an enclosed heating element extending approximately the full length of a side wall of the oven chamber with said element having an even and uniform heating action along its horizontal length is combined with means for forcibly bringing portions of the vapor laden and cooler aeriform contents of the oven chamber successively into direct and effective contact with the heating element to attain an increase in temperature of said contents, and in so doing attain an ignition and combustion of any inflammable or explosive vapors contained in said passing contents and at a point immediately adjacent to said heating element, before a return of such passing contents to the oven chamber in the desired highly heated condition. The present combination involves in addition the provision in connection with the enclosing means of the heating element, of controllable ducts and passages whereby a constant supply of fresh air is brought into the heating zone of said heating element before passage into the oven chamber, with such air supply replacing cooler portions of the aeriform oven contents which are exhausted from the oven chamber in the ordinary and proper ventilating of the oven chamber in the continued practical operation of the oven.

To provide in an industrial oven of the type above referred to, an intercontrolled combination of ventilating ducts, circulating ducts and means for heating and attaining a forced circulation of the aeriform contents of the oven chamber through said circulating ducts, and with which in the normal operation of the oven, a divisional portion of such oven contents and from a cooler portion of the oven chamber is allowed to escape and be replaced by a corresponding amount of fresh air which receives the required increased temperature before passing into the oven chamber. Said intercontrolled combination permitting of ready and convenient change or manipulation to effect a rapid and thorough evacuation from the oven chamber of its explosive aeriform contents, on the occurrence of a temporary or accidental stoppage of the normal operation of coacting units of the oven, all as will hereinafter more fully appear.

In the accompanying drawings:

Fig. 3 is a fragmentary horizontal section on line 3—3 Fig. 1.

Fig. 4 is an enlarged detail sectional elevation illustrating the reversing valve structures of the air inlet ducts of the oven chamber.

Fig. 5 is a like view of the reversing valve structures of the circulating ducts of the oven chamber.

Like reference numerals indicate like parts in the different views.

Figure 1:
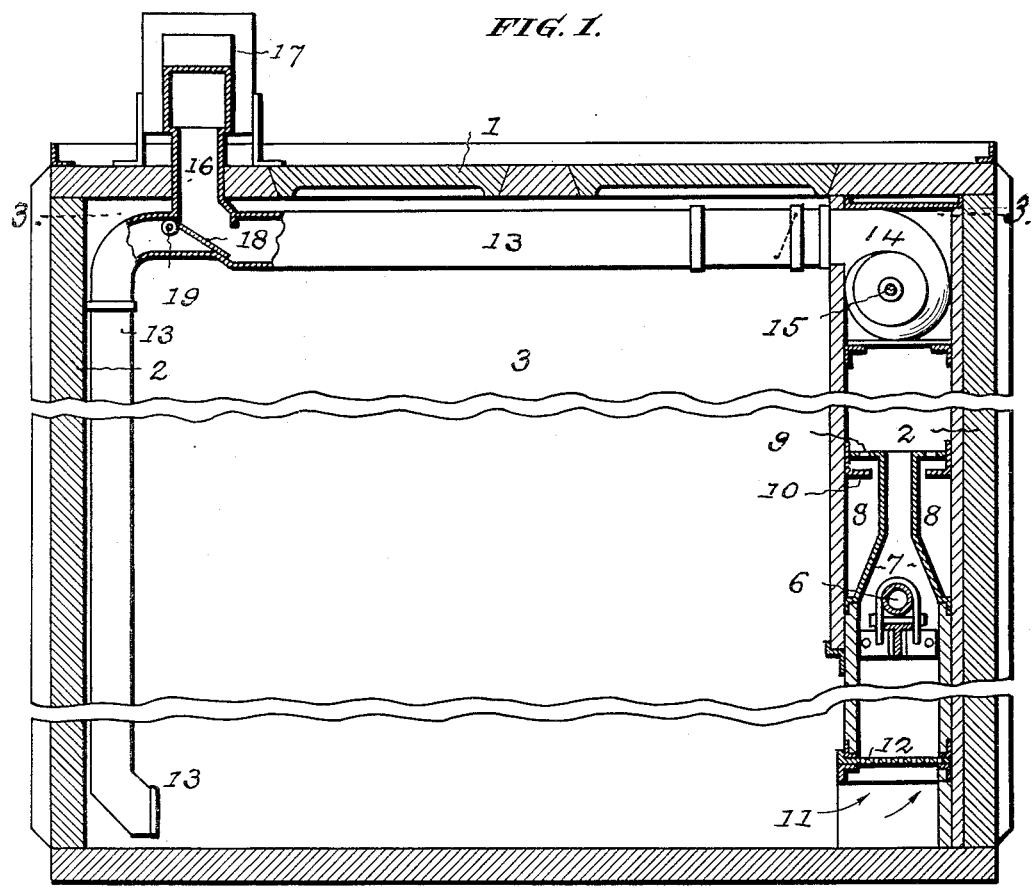
Fig. 1 is a transverse section on line 1—1 Fig. 3, of an industrial oven of the box type, having this improvement applied.

The general construction and arrangement of the oven parts and operating accessories are substantially the same as shown and described in my companion application for patent, Serial No. 548,110, filed July 1, 1931, with the oven housing comprising a flat roof or ceiling 1, side walls 2, rear wall 3 and front wall 4 having the usual entry doorway and door or doors for closing the same. And as in such former application, the heating and circulating means for the aeriform contents of the oven chamber will comprise a unitary heating and circulating structure adapted for detachable arrangement against the inner face of a side wall 2 of the oven, and comprising a structural formation and arrangement of parts as follows:

An upright closed casing 5, rectangular in shape and of a height and length approximating the height and length of the oven chamber, is located against a side wall 2 of the oven, and at its mid-width and approximately mid-height of its interior an elongated heater element 6 of either the flaming gaseous, the electric arcing or the electric incandescent types, is fixedly supported, and in all cases the heater element 6 is of a length equal to the horizontal length of the interior of the casing 5, so as to provide a uniform horizontal heating zone coextensive with the horizontal area of such interior.

At the respective sides of the heater element 6, vertical partitions 7 are arranged with their lower ends having out-turned extensions or flanges for fixed attachment to the side walls of the casing 5 to provide closed bottom walls for a pair of horizontal air inlet passages or chambers 8 in close lateral relation to the heater element 6.

The inlet chambers 8 extend the length of the oven housing and are open at their respective ends to the atmosphere, and at their upper ends the wall forming partitions 7 of said inlet passages are connected to the respective side walls of the heater casing 5 by orificed horizontal extensions 9 adapted to permit the passage of fresh air from said inlet passages into the respective side portions of the interior of the heating casing 5, above the heating element 6, as well as at the sides of the heated aeriform products which move upward past the heating element 6 and through the vertical passage formed by the partitions 7 aforesaid. With a view to attain a more even and effective flow of the air from the passages or chambers 8, the same are provided with baffle plates 10 as shown in Fig. 1. And in the preferred form of this construction the lower portions of the aforesaid partitions 7 have an outwardly flared form adapting the passageway between the partitions, to more effectively direct the aeriform contents of the lower portions of the interior of the casing 5 into close and direct contact with the heater element 6 so that any combustible or explosive vapor in such passing aeriform contents will be ignited and consumed at such point.

At its lower end the heater casing 5 has an inlet opening 11 along its length, with such opening preferably having the usual anti-flash wire screen 12, by which a reflex passage of flame to the inflammable aeriform contents of the oven chamber is prevented, while at its upper end the heater casing 5 has outlet connections with the hereinafter described circulating or return ducts 13 by which the aeriform contents from the heater casing 5 are returned to the oven chamber.

In adjacent relation to the upper end of the heater casing 5 and above the heater element 6, a plurality of rotary blowers or impellers are arranged in horizontally spaced relation, with their rotor members 14 secured to a carrying shaft 15, common to all, and journalled in the rear and front walls 3 and 4 of the oven housing, with said shaft having driven connection with a suitable power source.

As in my aforesaid application Serial No. 548,110 the central intake to the rotors 13 open laterally into the interior of the heater casing 5, while the peripheral discharges from said rotors are received by a corresponding series of the aforesaid ducts 13 which extend to and discharge into portions of the oven chamber remote from the entry opening 12 of the heater casing 5. In the construction shown in Fig. 1, each of the ducts 13 are arranged transversely beneath the oven ceiling 1 to the opposite side of the oven chamber, and from thence downwardly to a point of discharge adjacent to the floor of the oven chamber. Each of said ducts 13 has a branch connection 16 with an outlet trunk or stack 17 common to the series of branch connections 16, and by means of which the ventilating exhaust from the oven chamber is carried to the outer atmosphere in the normal operation of the oven.

Communication between each individual duct 13 and its aforesaid branch connection 16 is controlled by a movable valve member 18, preferably of the hinged type shown, with said valve member secured on a carrying shaft 19 which is common to the like valve members of the other ducts 13 of the series of ducts so that the series of movable valve members operate in unison.

One end of the carrying shaft 19 aforesaid extends outside the oven housing for proper manipulation of the series of movable valve members 18, either by hand or a semi-automatic operating mechanism, fully set forth in my companion application for patent Serial No. 548,112, filed July 1, 1931.

Intermediate of the aforesaid series of ducts 13, and on a plane with the horizontal portions thereof, a series of horizontal outlet inlet ducts 20 are in this improvement arranged, with one end of each duct 20 open to the outer atmosphere and the other end opening into the interior of the oven chamber at approximately its mid-width. Intermediate its length each outlet-inlet duct 20 has a branch connection 21 with the heretofore described outlet trunk or stack 17, with which said branch connections 21 have communication in common, the arrangement providing for a ventilating exhaust from a cooler portion of the oven chamber in the normal operation of the oven.

Communication between each outlet-inlet duct 20 and its branch connection 21 is controlled by a movable valve member 22, preferably of the hinged plate type shown, with said valve member fixedly secured to the before described carrying shaft 19, upon which the movable valve members 18 of the series of ducts 13 are mounted. With such arrangement of parts the carrying shaft 19 being common to both series of movable valve members 18 and 22, and with the relative arrangement shown, as the movable valve members 18 of the circulating ducts 13 moves to a position in which communication is open between said ducts 13 and their branch connections 16, for an oven ventilating purpose and delivery communication of the ducts 13 with the oven chamber is shut off.

Coincident with the above described condition of the movable valve members 18 of the circulating ducts 13, the like movable valve members 22 of the outlet-inlet ducts 20 are in a condition to close communication between said ducts 20 and their branch connections 21 and open communication through said ducts between the outer atmosphere and the interior of the oven chamber to replace with fresh air the aeriform oven contents in the speedy evacuation of such contents, in a safety evacuation operation, previous to a restarting of the normal operation of the oven.

Figure 2:
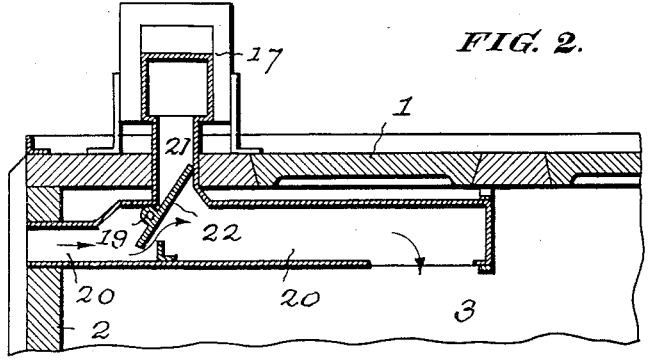
Fig. 2 is a fragmentary companion transverse section on line 2—2 Fig. 3.

The above described condition of the valve members 18 and 22 are shown in full lines in Figs. 1 and 2 and in dotted lines in Figs. 4 and 5. In the other condition of the valve members 18 and 22 as illustrated in full lines in Figs. 4 and 5, the movable valve members of the circulating ducts 13 entirely closes communication between said ducts 13 and their branch connections 16, while communication between said ducts and the oven chamber is in a free and open condition. In such condition of the movable valve members 18, a continued endless circulation of the aeriform contents of the oven chamber through the heater casing 5 takes place during the normal operation of the oven. In the corresponding change in the condition of the movable valve members 22 of the outlet-inlet ducts 20, communication between the outer atmosphere and the oven chamber through said ducts is entirely closed, and communication between said ducts and their branch connections 21 is fully opened, so that portions of the aeriform contents of the oven chamber may pass from cooler parts of the oven chamber to the outer atmosphere in the ventilation of the oven chamber during a normal operation of the oven.

Having thus fully described my invention what I claim as new, is:—

1. In an industrial oven of the type described, having a closed oven chamber and an outlet stack, the combination of a circulating duct associated with the oven chamber for effecting a circulation of the aeriform contents of the oven chamber, a heater casing forming a part of said duct, a rotary impeller associated with said duct and heater casing for effecting movement of said aeriform contents through said duct, a heating means in the casing aforesaid, a branch duct connecting the aforesaid duct with the outlet stack of the oven, a damper arranged in operative relation to said branch duct and adapted to control communication through the circulating duct and between the circulating duct and said outlet stack, a secondary duct arranged in the oven chamber and opening at one end into the oven chamber and at the other end to the outer atmosphere, a branch duct connecting said secondary duct with the outlet stack of the oven, a damper arranged in said secondary duct in operative relation to its branch duct and adapted to control commuication between the secondary duct and the outer atmosphere and between said duct and its branch duct, and a carrying shaft common to the damper of the circulating duct and the damper of the secondary duct, with said dampers so arranged that with one damper closing communication between the circulating duct and the oven outlet stack the other damper will open communication between the secondary duct and said outlet stack and close communication of said duct with the outer atmosphere and vice versa, and means for moving said shaft.

2. In an industrial oven of the type described, having a closed oven chamber and an outlet stack, the combination of a heating means in the oven chamber, a casing enclosing said heating means and having a direct inlet opening at its lower end into the oven chamber, a rotary impeller having communication with the upper end of said casing, a circulating duct opening at one end into the oven chamber at a point remote to the inlet of the aforesaid casing and at its other end having receiving connection with the rotary impeller, a branch duct connecting said circulating duct with the outlet stack of the oven, a damper arranged in said circulating duct in operative relation to said branch duct and adapted to control communication through the circulating duct and between the circulating duct and said outlet stack, a secondary duct arranged in the oven chamber and opening at one end into the oven chamber and at the other end to the outer atmosphere, a branch duct connecting said secondary duct with the outlet stack of the oven, a damper arranged in said secondary duct in operative relation to its branch duct and adapted to control communication between the secondary duct and the outer atmosphere and between said duct and its branch duct, and a carrying shaft common to the damper of the circulating duct and the damper of the secondary duct, with said dampers so arranged that with one damper closing communication between the circulating duct and the oven outlet stack the other damper will open communication between the secondary duct and said outlet stack and close communication of said duct with the outer atmosphere and vice versa, and means for moving said shaft.

In testimony whereof I hereunto affix my signature.

ARTHUR E. MAEHLER.